US007660789B2

(12) United States Patent
Anderson et al.

(10) Patent No.: US 7,660,789 B2
(45) Date of Patent: Feb. 9, 2010

(54) ENTITY AGENT

(75) Inventors: Jeffrey R. Anderson, West Fargo, ND (US); John A. Healy, West Fargo, ND (US); John W. Honeyman, Bellevue, WA (US); Ryan A. Munson, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 131 days.

(21) Appl. No.: 11/173,308

(22) Filed: Jul. 1, 2005

(65) Prior Publication Data

US 2007/0005577 A1 Jan. 4, 2007

(51) Int. Cl.
*G06F 7/00* (2006.01)
*G06F 17/30* (2006.01)
(52) U.S. Cl. .................... 707/4; 707/103 Y; 717/108
(58) Field of Classification Search ................. None
See application file for complete search history.

(56) References Cited

U.S. PATENT DOCUMENTS

| 5,475,817 | A  | * | 12/1995 | Waldo et al. ............... 719/316 |
| 5,497,491 | A  | * | 3/1996  | Mitchell et al. ............. 719/315 |
| 6,611,838 | B1 | * | 8/2003  | Ignat et al. .................. 707/101 |
| 6,857,123 | B1 | * | 2/2005  | Nuxoll et al. ............... 719/316 |
| 7,000,238 | B2 | * | 2/2006  | Nadler et al. ............... 719/330 |
| 7,213,208 | B2 | * | 5/2007  | Reichel et ................... 715/746 |
| 2003/0070006 | A1 | * | 4/2003 | Nadler et al. ............... 709/330 |
| 2005/0198196 | A1 | * | 9/2005 | Bohn et al. .................. 709/217 |
| 2006/0122971 | A1 | * | 6/2006 | Berg et al. ...................... 707/3 |
| 2006/0294038 | A1 | * | 12/2006 | Grossfeld et al. .............. 707/1 |

OTHER PUBLICATIONS

Oracle JDeveloper 10g Reviewers Guide, Mar. 2004, Oracle, http://www.oracle.com/technology/products/jdev/collateral/papers/10g/reviewer/reviewerguide.html.*
Steve Muench, Simplifying J2EE and EJB Development with BC4J, Apr. 2002 http://www.oracle.com/technology/products/jdev/collateral/tutorials/903/j2ee_bc4j/prnt/j2ee_bc4j.html.*
Oracle9i JDeveloper 9.0.3 New Features, Oct. 2002, Oracle, http://www.oracle.com/technology/products/jdev/htdocs/jdev903Preview_fo.html.*
Deepak Alur, John Crupi, and Dan Malks, "Data Access Object", Core J2EE Patterns: Best Practices and Design Strategies, Jun. 26, 2001, Perrson Education, 1st edition, pp. 390-407.*
Eric Armstrong, Jennifer Ball, Stephanie Bodoff, Debbie Bode Carson, Ian Evans, Dale Green, Kim Haase, Eric Jendrock, "Container-Managed Persistence Examples", The J2EE 1.4 Tutorial, Jun. 17, 2004, Sun Microsystems Inc, pp. 969-1034.*
Harshad Oak, Oracle JDeveloper 10g: Empowering J2EE Development, Jan. 2004, Apress.*

* cited by examiner

*Primary Examiner*—Neveen Abel Jalil
*Assistant Examiner*—Vei-Chung Liang
(74) *Attorney, Agent, or Firm*—Westman, Champlin & Kelly, P.A.

(57) ABSTRACT

An abstraction for rich data access for consumers of a service in a service oriented system. The abstraction is created by the author of a service which owns the data, and includes a number of service-public properties and associations. Further, the abstraction can contain metadata and logic that provides for a rich, interactive experience for the consumer interacting with the data encapsulated by the entity agent. These can include verifying that the data conforms to the contract published by the owning service, validating and defaulting properties, and validating associated data. Also the abstraction can contains metadata and logic for transmitting of the data back to the owning service and optionally saving to the local data store of the consumer.

18 Claims, 7 Drawing Sheets

ENTITY AGENT

BACKGROUND

A service is a system that a consumer of the service interacts with through a set of coarse-grained messages. A service oriented application may be composed of one or more services. Each of these application services typically contains a set of entities. Entities, in general, encapsulate data and provide a rich programming model for reading, writing, updating and deleting the data owned by the service.

Services typically contain private data and public data. The private data is encapsulated in an internal entity so that, within the service, the programming model provides access to all of the data and associations contained in the internal entity, but external to the service, the internal entity is not exposed through the service interface. However, public data is encapsulated in a publicly available entity which is available to consumers of the service.

Services also typically expose a plurality of publicly available data contracts. The data contracts identify the publicly available entities and the properties contained within those entities and specify how the entities are associated or related. Upon being queried through an interface, the service will generally provide access to data in the publicly available data contracts to the requestor.

It is common for a consumer of a service to access data of an entity owned by the service. One prior way for enabling this had the consumer directly access the owning service's data store. However, a direct access to the owning service's data store requires the consumer of the data to have knowledge of the technology and table structure used by the owning service to store data in its data store. Similarly, such direct access allows the consumer to potentially view and change private data within the service. This is problematic for a number of reasons, and is discouraged in applications that honor the publicly known tenets of service orientation. These are set out in an article by Don Box entitled *Code Name Indigo: A Guide to Developing and Running Connected Systems with Indigo*, MSDN Magazine, January 2004. Basically, allowing an external service or client to bind directly to the owning service's data (either by access to the service's private entities or by directly accessing the data store which the service stores its data in) is a technique that compromises data integrity, the autonomy, and the explicit boundaries of the service in a service oriented environment. Instead, all communication between services should use standardized message exchange.

In addition, to comply with the aforementioned tenets developers must develop systems in which the services are autonomous. Synchronizing and replicating data locally to the consumers of the service is often done to achieve such autonomy. This allows for the owning service to not have to be online to retrieve data and process requests.

Traditionally, clients that are communicating with other services utilize Extensible Mark-up Language (XML) directly, or generated proxy classes without encapsulated business logic. This causes the clients to employ a more batch oriented, less interactive user experience. A more interactive experience would provide a mechanism for the client to ensure that the data provided is correct for the owning service, that the data is transmitted in the correct manner, and even allow data to be defaulted, or auto-populated, as the user interacts with the client application.

However some developers of clients have attempted to manually build this interactive user experience. For clients that do support a more interactive user experience, the developers find themselves writing large amounts of logic on the client to support this interactivity. Further, clients typically need to supply a URI or URL which represents the physical location of the destination service. They need to supply the protocol they wish to communicate to the service with. They also need to manage the creation of communication channels and other intricacies of communicating with a service. Most often, the developer of the client does not understand the necessary logic to provide the rich interactive experience to the user. However, the entity author of the owning service generally understands the logic necessary to provide the interactive experience.

SUMMARY

One embodiment is directed towards an abstraction that encapsulates the needs defined above, called an entity agent, to provide a rich client interaction for users in a service oriented system. The entity agent is created by the author of the service which owns the data, and includes all service-public properties and associations. Further, the entity agent contains metadata and logic that provides for a rich, interactive experience for the consumer interacting with the entity agent instead of through a generated proxy which does not contain business logic. These include verifying that the data conforms to the contract published by the owning service, validating and defaulting properties and associations on the entity agent. Also the entity agent has associated metadata that defines how to transmit the data back to the owning service and how or whether to persist data to the local data store of the client.

Another embodiment of the present invention is a method of creating an entity agent for an entity within a service. First the entities of the service are identified. Then the entities are defined as service-public and service-private. Next the service-public properties of the service-public entities are identified. Those service-public properties are used to create the definition of the entity agent. Next a variety of logic is applied to the entity agent either by associating metadata to the entity agent or by adding logic directly to the entity agent itself. This logic provides features for 1) ensuring the validity of the data 2) defaulting of data based on other data 3) persistence to a local data store of the consumer 4) transmitting of the message to the owning service Yet another embodiment is directed to a method of using an entity agent in a service oriented system. In this embodiment a consumer binds to the entity agent. During the binding, the consumer adds a reference to the entity agent. Then the consumer contains programming logic which generates an instance of the entity agent at runtime. Once the instance has been created, the consumer proceeds to utilize the entity agent. During the consumer interaction with the entity agent instance, logic is executed that ensures the validity of the data and also performs any defaulting of data based on other data. Once the consumer interaction is complete and the consumer wishes to save the additions and/or changes, the logic within the entity agent will optionally save the changes to the consumer's local data store. Also, the entity agent can determine the policy and protocol needed to communicate with the owning service and transmit the message conforming to those. Upon receiving the message, the owning service will transform the message into an internal schema and persist via the internal entity.

DETAILED DESCRIPTION

The present invention deals with generating and using an entity agent. The entity agent is created by the author of the service owning the data, and may be used by one ore more consuming applications/services which require rich access to that data. The consumer may illustratively be a client, or another service. However, before describing the present invention in greater detail, one illustrative environment in which the present invention can be used will be described.

Figure 1:
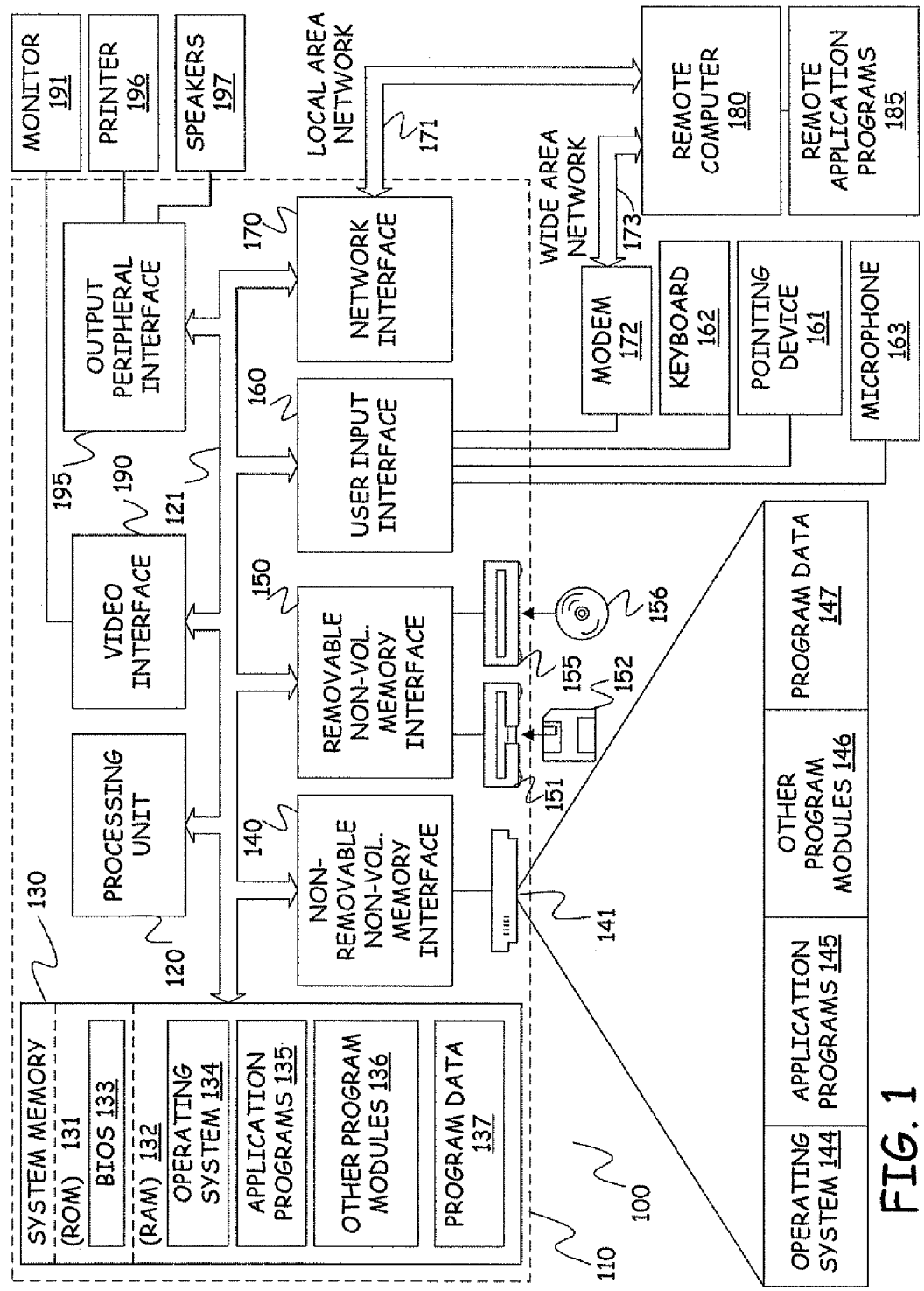
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
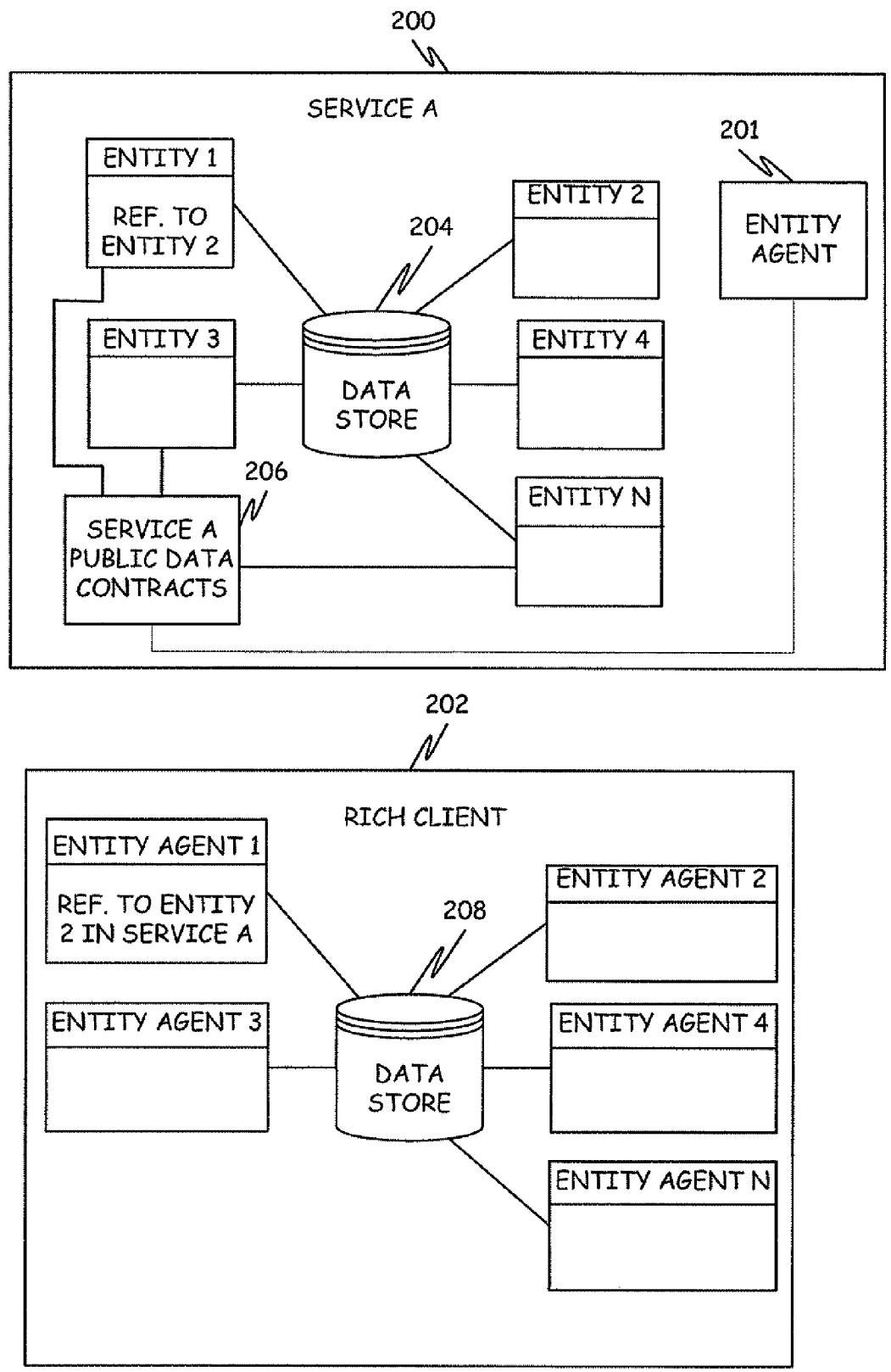
FIG. 2 is a block diagram of a service and a rich client, the service having entities and public data contracts.

FIG. 2 is a block diagram of one autonomous service (Service A) and a rich client (or consumer) communicating with that service. Service A represented by numeral 200 and a rich client represented by numeral 202. Service A is shown with a plurality of entities (entity 1-entity N) that are stored in a data store 204 that is local to service A. FIG. 2 also shows that service A includes one or more public data contracts 206 that represent the service-public entities owned by other services, how they are related, and the publicly available properties in each of those entities. There may illustratively be one data contract per entity. However, the data contracts could be arranged in other ways as well. Further, service A references an entity agent 201 that encapsulates data owned by other services.

The rich client includes a plurality of entity agents (entity agent 1-entity agent N) that are stored in a data store 208 that is local to the rich client. For the sake of the present discussion, the rich client is referred to as the consumer 202. That is because the rich client includes entity agents that encapsulate data owned by service A. For instance, entity agent 1 in the rich client encapsulates data owned by service A. Therefore, the rich client is designated as the consumer 202 because it consumes data owned by another service. It will of course be noted that by consumer it is meant a service, application, entity, or other component that requires rich, interactive access to data owned by another service.

In this embodiment, the consumer is a rich client. A rich client presents an interactive user experience to the end user of the system; meaning that the end user can enter data and receive immediate feedback of invalid data and also have data defaulted (or auto-populated) as they enter data. Rich clients often have cached or synchronized data that enables this interactivity. If the data were not cached or synchronized, the performance degradation of sending requests to the owning service every time the end user tabbed off of a field on a form, would detract from the overall user experience. Further, in some rich clients the entities agents are saved to a local data store prior to, or simultaneously to, sending the modified entities agents back to the owning service.

In prior systems, in order for the rich client to access the data in service A, a number of different techniques could be used. In a first technique, the rich client would require direct reference to the entity in service A and/or the data stored in data store 204 in service A. This would lead to a number of problems which are discussed in the background portion of this description. Alternatively, the rich client could query service A for all of entity 2, even though the rich client was only interested in a subset of the properties of entity 2 in service A. This also leads to disadvantages described in the background. Further, by binding directly to the data store in service A the consumer would not have access to many features that can assist the consumer in ensuring that the correct data is entered.

Figure 3:
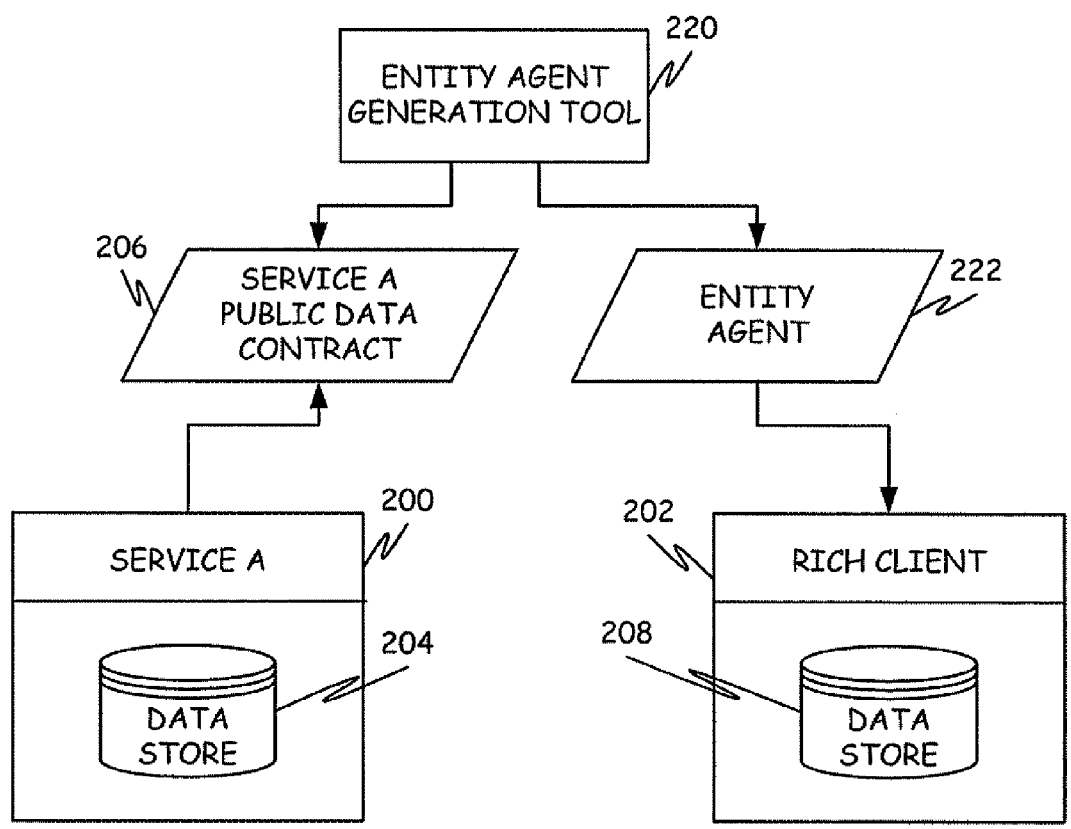
FIG. 3 illustrates a generation tool used for generating entity agents in accordance with one embodiment of the present invention.

FIG. 3 shows that the present invention provides an entity agent generation tool 220 that accesses the public data contracts 206 from service A and creates an entity agent 222 from the information stored in one or more contracts 206, and allows the rich client to bind to the entity agent 222. The entity agent 222 when bound to the rich client will be deployed locally and utilized as a local abstraction. This same abstraction may be deployed to multiple clients. The entity agent 222 contains only the properties from service A that are deemed public by service A.

Figure 4:
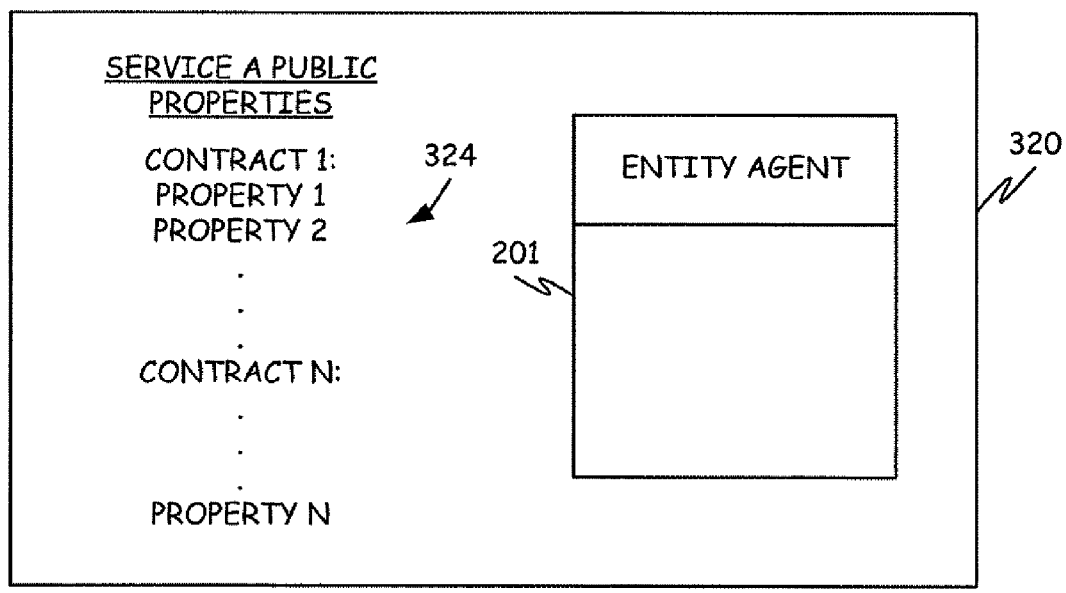
FIG. 4 illustrates an exemplary display for allowing a developer to create an entity agent from a public data contract.

Tool 220 generates a class containing the public properties based on the information set out in the publicly available data contracts 206. FIG. 4 illustrates one illustrative embodiment of an interface display 320 illustrating this. The generated class (the entity agent or entity agent class) is illustrated at 201 on display 320.

FIG. 4 also shows, on the left half of the display, that tool 220 displays a list of the publicly available properties in the public data contracts from the relevant entities in service A. This is indicated generally at 324 in FIG. 4. Once this display 320 is generated, the user can simply drag properties from list 324 onto the entity agent class 201 in order to populate the entity agent class 201 with the desired properties. By default, the entity agent definition will contain the required fields (minimum set of properties) of the entity.

The entity agent is an abstraction that can be initially generated from the data contract of an entity to be exposed to any consumer who wishes to perform creates, updates, and/or deletes of that entity. The entity agent can include any number of properties exposed from the owning service's data contract, and must also contain the required fields (minimum set of properties) of the entity.

As discussed above, entities, in general, encapsulate data and provide a rich programming model for data access. It will be noted that the entities and entity agent shown and discussed with respect to the present invention, as is generally known, have functionality that enables them to load and persist information from a database, and they are not simply object classes with a few properties. Instead, as is known, entities are much richer. In a service oriented system it is desirable to maintain the same programming model for consumers who wish to utilize the service oriented platform. Services have access to all of the data and associations encapsulated by their own entities, however, external to the service, the service's entities are not visible (i.e. not exposed via the service interface). Thus an entity agent is provided to consumers who require rich support for entity creates, updates, and deletes.

Generally, an entity agent is an encapsulation of public data exposed from a given service which provides a rich entity programming model (i.e. local persistence, defaulting and validation) for consumers who wish to perform create, update, or, delete ("CUD") operations on a given entity owned by an external service. The entity agent can represent the widest possible set of properties a given service wishes to expose for any given internal entity. The entity agent also provides logic for saving to the local data store and formulating and sending the corresponding CUD requests (as a message) to the owning service.

Figure 5:
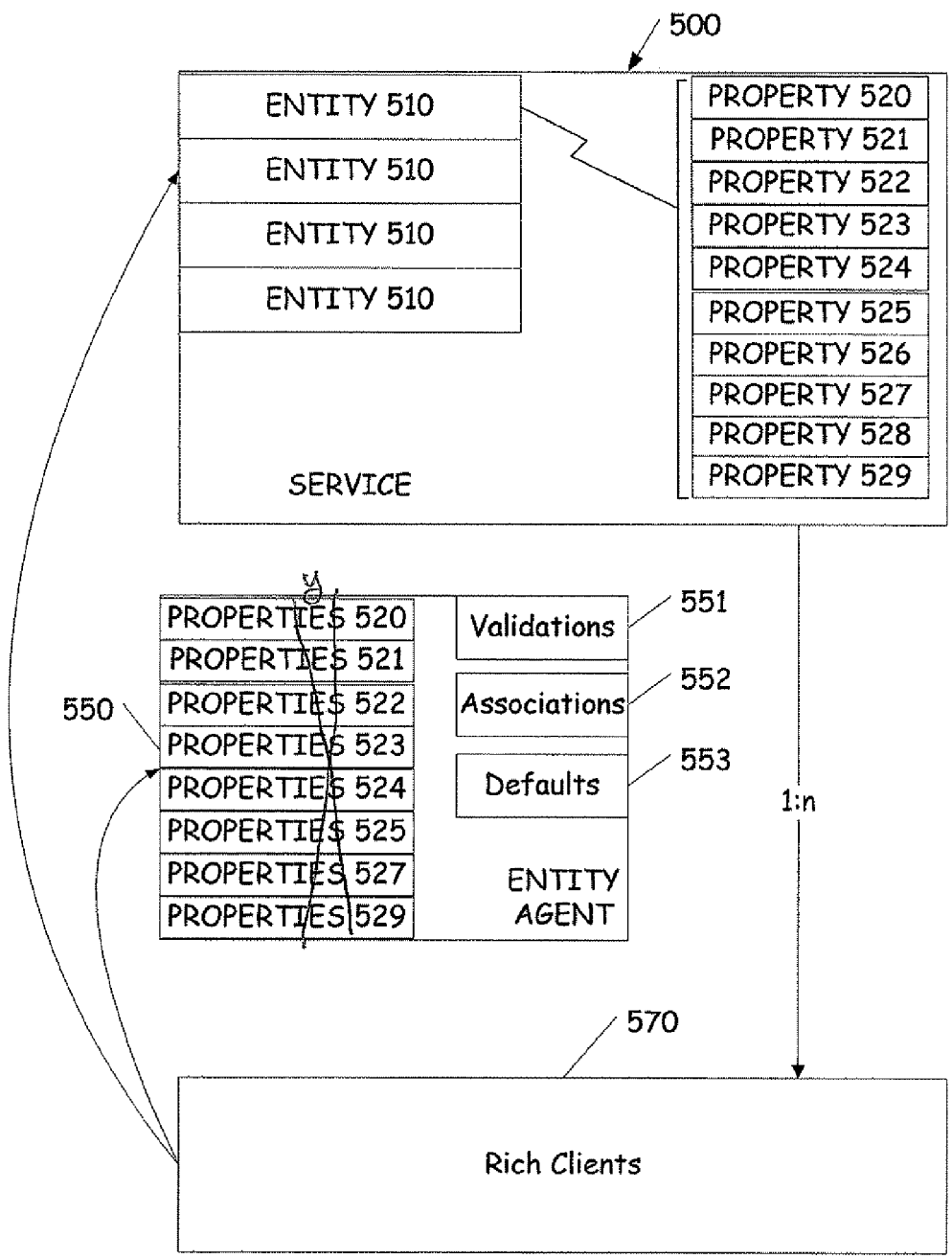
FIG. 5 is a block diagram of an owning service in which the service author has created an entity agent and a client binding to the entity agent.

FIG. 5 is a block diagram illustrating a service in a service oriented system in which the service author has created an entity agent. As discussed earlier, a service, such as service 500, contains a number of entities 510. Each of the entities includes a number of entity properties 520-529. These properties 520-529 represent information that is used by the service 500 in the execution of its designed functions. In the example in FIG. 5 the service is a sales service and the entity is an invoice entity. However, other types of services and entities can be used.

Each entity 510 is defined as either service-public or service-private. A service-private entity is an entity that the service does not publish to other services as part of a contract. A service-public entity is an entity that the service publishes as part of the contract. Further each property of a service-public entity is also defined as a service-public or service-private. Once again a service-public property is a property that is published as part of the contract.

Service-private entities are not exposed via the service contract. The data that the service-private entity encapsulates is only visible/consumable within the owning service. Service-public entities are exposed via the service contract. The data exposed by the data contract of the service-public entity is visible/consumable by external consumers. An entity agent may be built conforming to the data contract of the service-public entity which would assist consumers in properly formulating entity create, update, and delete requests that subsequently get sent to the owning service.

Entity 510 is an invoice entity used within sales service 500. The invoice entity 510 includes ten entity properties 520-529. However an entity can have any number of properties. Invoice entity 510 is identified as being service-public. This identification is accomplished, in one embodiment, through the use of metadata. However, other methods of labeling or identifying an entity as public can be used.

Of the ten properties of entity 510, seven of the properties are identified as being service-public and three are identified as being service-private. However, any number of properties can be made service-public. Again the labeling or identifying of the public nature of the properties is done in metadata. However, other methods can be used. In the sales invoice example some of the public properties could be customer name, customer address, customer phone number, items ordered, number of items ordered, etc. Some private properties could include information that is used for calculating a discount on the item order, or the unit cost to the supplier of the item.

The author of service 500 has also created an entity agent 550. Entity agent 550 is an abstraction of the data that the service 500 has identified as service-public data. Entity agent 550 provides a way for consumers to interact with the data of service 500 and to obtain a rich environment in which to communicate or otherwise interact with service 500. In some embodiments the entity agent 550 is a generated class in the language of the service. In one embodiment the entity agent 550 is a C# class. However, classes built in different languages targeting different platforms may be used.

Entity agent 550 includes all of the data and metadata that the service 500 publishes as part of its contract with consumers. In the sales invoice example the entity agent 550 includes the public properties 520-525, 527 and 529.

Further, the entity agent 550 can include additional functionality that assists in providing the rich interaction with the service 500. This additional functionality can include validation 551, associations 552, and defaults 553. However, other functionality can be included in the entity agent.

Validation 551 is in one embodiment, functionality provided to the consumer of the entity agent to verify the correctness of the data prior to sending the data to the owning service.

Associations 552 are in one embodiment, logic designed to provide the consumer of the entity agent with information about associated entities owned by other services. In one example, there may be an association from the invoice entity agent to the customer the invoice is for. These associations allow the user to have a better understanding of the relationship between data.

Defaults 553 are in one embodiment, functionality to provide default values when creating or manipulating the entity agent. Defaults 553 determine how certain data is auto-populated based on values of other data. For example, if the end user entered in a certain number of an item to be ordered, the extended price or a discount property could default to a set value in response.

This additional functionality allows the consumer to interact with the owning service in a rich environment without having knowledge of the intricate details of how to validate and default information as the data is manipulated by the consuming application (rich client or consuming service).

When a rich client 570 chooses to communicate with service 550 it is presented with two options. The process of communicating with the service will be discussed in greater detail with respect to FIG. 7. Further, any number of rich clients 570 can communicate with service 550. The consumer uses the entity agent just as if the entity agent 550 was an entity it owned. Through the use of the entity agent 550 the developer can ensure that proper procedures are followed for the data entry prior to sending the message to the owning service.

Figure 6:
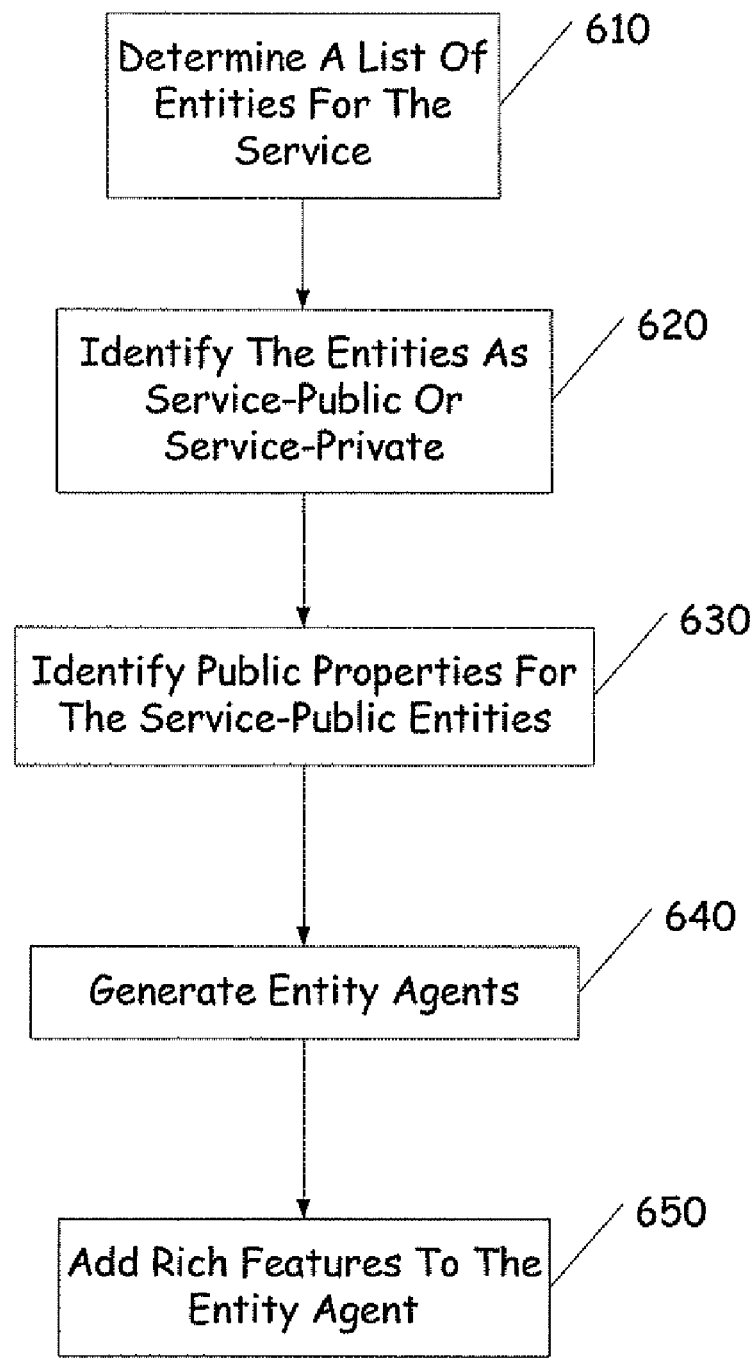
FIG. 6 is a flow diagram illustrating the steps performed according to one embodiment to generate an entity agent.

FIG. 6 is a flow diagram illustrating the process of generating an entity agent according to one embodiment of the present invention. In one embodiment the entity agent is generated using a tool. This tool can be a graphical user interface, a compiled computer application, or any other program that allows for the generation of the entity agent. In the first step of the process the entities for the service are determined. This is illustrated at step 610.

Next, the tool needs to determine which of the entities are service-public. This is illustrated at step 620. In one embodiment, the entities that are service-public are determined from the metadata for the entity. As discussed above, a service may have both service-public and service-private entities. Further, each entity within the service may have properties which are both service-public and service-private. At step 630, the tool determines which properties of the public entities of the service are service-public. However, depending on the configuration of the service, the author, through the tool may use an interface to identify which entities and properties thereof are service-public. For example in a sales order service, an invoice entity may exist. The invoice is an entity within the sales order service, and is made service-public by the service, as other services will likely need information contained in the invoice. The invoice has in this example ten properties, of which seven of the properties are service-public properties. These properties will be identified at step 630.

Following the identification of the entities and properties of the entities that are service-public, the tool generates the entity agents for the service. This is illustrated at step 640. The tool can be driven directly from the service-public entities or the data contracts exposed by those service-public entities.

During the generation of the entity agents, other functionality can be added. This functionality can include validation, associations and defaults. These features are added to the entity agent at step 650.

Figure 7:
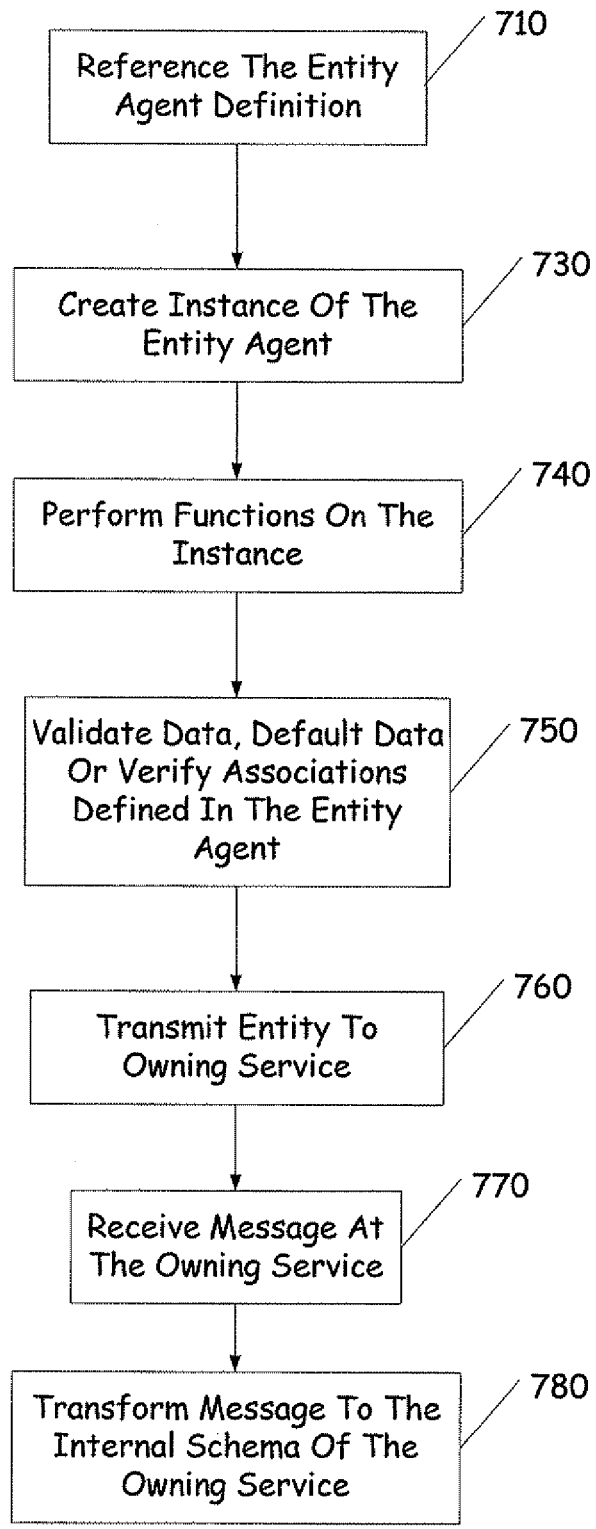
FIG. 7 is a flow diagram illustrating the steps performed according to one embodiment when using an entity agent.

FIG. 7 is a flow diagram illustrating the use of an entity agent by a consumer according to one embodiment of the present invention. The first step is for the consumer to reference the entity agent. This is illustrated at step 710. Referencing the entity agent involves binding to the entity agent definition.

Once the entity agent has been referenced, the consumer can then write programming logic to create an instance of the entity agent. This is illustrated at step 730. At this step the consumer will use the entity agent definition to create an in-memory instance of that definition. Any programming logic needed to modify this instance of the entity can be written at this time. This is illustrated at step 740.

After creation of the instance programming logic that interacts with the entity agent can assume that the rich, interactive programming model, of the entity agent will provide functionality for defaulting of data, validation of the data, and verifying the associated data. This process is illustrated at step 750. This prevents the programming logic of the consumer from constantly needing to send requests to the owning service to validate and default data as the entity is being manipulated.

Once the programming logic is written to manipulate the entity agent at steps 740 and 750 the consumer can then trigger the transmission of the change to the owning service via a simple programming model; for instance, EntityAgent.Save( ). This will automatically send the entity with the change to the owning service without the consumer requiring knowledge of the service location, protocols, message formulation, and other intricacies of communication with a service. This is illustrated at step 760. The logic used to send the entity back to the owning service is driven by the metadata applied to the entity agent. The logic that determines whether to persist to a local data store is also driven by metadata applied to the entity agent.

The change to the entity is then received by the owning service as a message. This is illustrated at 770. This message that is received conforms to the contract schema of the owning service. In one embodiment the contract schema is an XSD contract schema. The message is then transformed to the internal entity definition of the owning service. This is illustrated at step 780. At this step the owning service is able to default or otherwise modify any of its internal or private properties in response to the received message.

Thus by using an entity agent, the consumer is able to easily build programming logic to manipulate data owned by a separate service and guarantee that the data is correct and that all necessary pre-population of data is complete prior to sending the request back to the owning service. The consumer does not require detailed knowledge of the underlying business rules or defaulting logic utilized by the owning service. This allows the consumer to have a richer experience than is generally possible using generated proxies and public data contracts from the owning service, yet still preserves the aforementioned tenets of service orientation.

Although the present invention has been described with reference to particular embodiments, workers skilled in the art will recognize that changes may be made in form and detail without departing from the spirit and scope of the invention.

What is claimed is:

1. A method of generating abstractions of entities for a service, comprising:

identifying a plurality of entities for the service, the entities encapsulating data and providing a programming model for the data, wherein the entities are stored in a data store that is local to the service, wherein the plurality of entities for the service comprises at least one service-private entity and a plurality of service-public entities, wherein the at least one service-private entity does not publish to other services as part of a public data contract, the at least one service-private entity only being visible and consumable within the service, wherein each of the plurality of service-public entities publishes to the other services as part of the public data contract, wherein each of the plurality of service-public entities comprises a plurality of properties, the properties representing information that is used by the service in execution of its designed functions, wherein the plurality of properties include service-public properties and service-private properties, the service-public properties being published as part of the public data contract;

utilizing an entity agent generation tool to access the public data contract from the service;

identifying the plurality of service-public entities from the plurality of entities for the service based at least in part on the public data contract;

identifying, for each of the plurality of service-public entities, the service-public properties within the service public entity, the identification of the service-public properties being based at least in part on metadata within the public data contract;

creating a plurality of entity agents that are abstractions corresponding to the identified service-public entities, the abstractions being invokable to access data encapsulated by the service-public properties within the identified service-public entities, wherein the entity agents are generated classes in a language of the service, and wherein the service and the client interact through a set of coarse-grained messages;

adding features to the abstractions to enhance usability of the abstractions, wherein the features include verifying a correctness of entered data prior to sending the entered data to the service, providing feedback to a user of data invalidity, auto-populating data as a user enters data, and providing information about entity ownership;

deploying the plurality of entity agents to a client;

receiving, from the client, a message indicating a change to one of the identified service-public entities, the message conforming to a contract schema of the service, the message being generated utilizing one of the plurality of entity agents;

transforming the message into an internal entity definition of the service; and modifying an internal property of the service in response to the received message.

2. The method of claim 1 further comprising the client referencing at least one of the plurality of entity agents by binding to a definition of the at least one of the plurality of entity agents.

3. The method of claim 2 further comprising the client writing programming logic to create an instance of the at least one of the plurality of entity agents after the at least one of the plurality of entity agents has been referenced.

4. The method of claim 3 further comprising:

storing the plurality of entity agents to a data store that is local to the client.

5. The method of claim 4 wherein creating the plurality of entity agents comprises utilizing a graphical user interface, the graphical user interface displaying a list of the service-public properties in the public data contract and a generated entity class, and wherein a user drags one of the service-public properties from the list to the generated entity class to populate one of the entity agents.

6. The method of claim 4 wherein at least one of the abstractions is generated off of a service-public schema of a service-public entity within the service, for which the at least one of the abstractions is created, wherein the service-public schema is an XSD contract schema, and wherein the client is another service, the another service being a system that a consumer interacts with through a set of coarse-grained messages.

7. The method of claim 4 further comprising:

deploying the plurality of entity agents to a second client and storing the plurality of entity agents in a data store that is local to the second client.

8. The method of claim 4 further comprising:

accessing a second public data contract.

9. The method of claim 8 wherein identifying the plurality of service-public entities from the plurality of entities for the service is further based at least in part on the second public data contract.

10. A method of communicating with an owning service having an entity agent and a consumer, comprising:

adding a reference to the entity agent, the entity agent representing service-public properties of service-public entities, the service-public entities encapsulating data and providing a programming model for the data, wherein the owner service includes a plurality of entities that comprise the service-public entities that represent the entity agent and at least one service-private entity, wherein the plurality of entities are stored to a local data store of the consumer; wherein adding the reference comprises binding to an entity agent definition, the entity agent definition including a minimum set of properties for the plurality of entities, wherein the at least one service-private entity does not publish to other services as part of a public data contract, wherein the service-public entities publish to the other services as part of the public data contract;

creating and storing in memory an instance of the entity agent on the consumer at runtime, the instance of the entity agent providing support for creation, update, and delete operations on the service-public entities of the owner service;

modifying the data through the instance of the entity agent, wherein modifying the data comprises interacting with logic and metadata of the entity agent, the consumer having cached or synchronized data that enables tile interacting, wherein the interacting includes a user receiving immediate feedback of invalid data and having data auto-populated as the user enters data;

transmitting the change through the instance back to the owning service for transformation into an internal schema of the owning service;

persisting the change to the local data store of the consumer, the entity agent providing logic for persisting the change to the local data store and for transmitting the change to the owning service; and wherein the owning service and the consumer interact through coarse-grained messages.

11. The method of claim 10 wherein transmitting the change to the owning service and persisting the change to the local data store of the consumer are performed simultaneously, and wherein the user receiving immediate feedback of invalid data comprises verifying a correctness of the entered data prior to sending the entered data to the owning service and providing feedback to the user of data invalidity.

12. The method of claim 10 wherein persisting the change to the local data store of the consumer is performed prior to transmitting the change to the owning service, and wherein having data auto-populated comprises defaulting data into the instance as the user enters data.

13. The method of claim 10 wherein interacting further comprises:

verifying associations in the instance, wherein verifying comprises providing information about entities that are owned by other services.

14. The method of claim 13 further comprising:

receiving the change to the entity agent at the owning service as a message; and transforming the message to an internal schema of the owning service.

15. The method of claim 14 wherein the internal schema of the owning service is an XSD contract schema.

16. The method of claim 15 wherein the entity agent is a class in a language of the owning service.

17. The method of claim 16 wherein the entity agent is a C# class.

18. The method of claim 10 wherein the consumer is a service that another consumer interacts with through coarse-grained messages.

* * * * *